United States Patent
Hiscock et al.

(10) Patent No.: US 9,559,981 B2
(45) Date of Patent: Jan. 31, 2017

(54) PROVIDING AGREEMENT INFORMATION TO ALLOW ACCESS BY A CLIENT DEVICE OF SELECTED EQUIPMENT FROM AMONG MULTIPLE EQUIPMENT

(75) Inventors: James S. Hiscock, Rockport, MA (US); Paul T. Congdon, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 136 days.

(21) Appl. No.: 14/391,824

(22) PCT Filed: Jul. 30, 2012

(86) PCT No.: PCT/US2012/048806
§ 371 (c)(1),
(2), (4) Date: Oct. 10, 2014

(87) PCT Pub. No.: WO2014/021814
PCT Pub. Date: Feb. 6, 2014

(65) Prior Publication Data
US 2015/0134819 A1    May 14, 2015

(51) Int. Cl.
*H04L 12/927* (2013.01)
*H04L 29/06* (2006.01)

(52) U.S. Cl.
CPC ............ *H04L 47/80* (2013.01); *H04L 63/102* (2013.01)

(58) Field of Classification Search
CPC .... H04L 47/80; H04L 63/102; H04L 63/0815; H04L 63/0838; H04L 67/10; G06F 21/41
See application file for complete search history.

(56) References Cited

U.S. PATENT DOCUMENTS

| 5,736,982 A | 4/1998 | Suzuki |
| 7,376,830 B2 | 5/2008 | Sethi |
| 7,716,165 B2 | 5/2010 | Zhang |
| 7,752,542 B2 | 7/2010 | Cragun |

(Continued)

FOREIGN PATENT DOCUMENTS

| CN | 101374050 | 2/2009 |
| CN | 101415007 | 4/2009 |

(Continued)

OTHER PUBLICATIONS

James S. Hiscock et el., U.S. Appl. No. 13/561,593 entitled Selecting Equipment Associated With Provider Entities for a Client Request flied on Jul. 30, 2012.

(Continued)

*Primary Examiner* — Kim T Nguyen
(74) *Attorney, Agent, or Firm* — Hewlett Packard Enterprise Patent Department

(57) ABSTRACT

Agreement information based on agreements between an intermediary service provider and a plurality of provider entities that operate respective multiple equipment is stored by an intermediary system. The agreement information includes information to enable access of each of the multiple equipment by a client device. Client information associated with the client device is also stored by the intermediary system. The agreement information is useable to provide access by the client device of selected ones of the equipment.

15 Claims, 6 Drawing Sheets

(56) References Cited

U.S. PATENT DOCUMENTS

| | | |
|---|---|---|
| 7,917,944 B2 | 3/2011 | Touve |
| 8,161,397 B2 | 4/2012 | Kalasapur |
| 2003/0177187 A1 | 9/2003 | Levine |
| 2008/0289023 A1 | 11/2008 | Wardrop |
| 2009/0187978 A1 | 7/2009 | Upendran et al. |
| 2009/0288138 A1 | 11/2009 | Kalofonos |
| 2011/0247066 A1 | 10/2011 | Lee |
| 2012/0005723 A1 | 1/2012 | Chaturvedi et al. |
| 2012/0030733 A1 | 2/2012 | Andrews |
| 2012/0122488 A1 | 5/2012 | De Luca |
| 2013/0051772 A1* | 2/2013 | Ramaswamy ... H04N 21/25875 386/291 |
| 2013/0312076 A1* | 11/2013 | Houthooft ........... H04L 63/0815 726/8 |

FOREIGN PATENT DOCUMENTS

| | | |
|---|---|---|
| CN | 101600169 | 12/2009 |
| CN | 102446290 A | 5/2012 |
| CN | 202210812 U | 5/2012 |

OTHER PUBLICATIONS

Kyu-Han Kim et al., On Cloud-Centric Network Architecture for Multi-Dimensional Mobility to be published Aug. 17, 2012) (6 pages).

M. Lentczner, Internet Engineering Task Force Internet-Draft Linden Research, Inc., Intended status: Grid Protocol: Foundation, draft-lentczner-ogp-base-00 , Mar. 3, 2009.

Parsiegla, V. et al., A Network Aware Protocol for Switching HTTP Streams Between Devices, Sep. 6-8, 2011 (5 pages).

Chinese Office Action issued in Appl. No. 201280072819.8; dated Oct. 21, 2016; 7 pages.

* cited by examiner

PROVIDING AGREEMENT INFORMATION TO ALLOW ACCESS BY A CLIENT DEVICE OF SELECTED EQUIPMENT FROM AMONG MULTIPLE EQUIPMENT

BACKGROUND

With the proliferation of mobile devices, such as notebook computers, tablet computers, personal digital assistants (PDAs), smartphones, and so forth, users are able to perform computing tasks wherever they travel. Additionally, a user can also be associated with multiple electronic devices, for use in different contexts (e.g. for use at work, for personal use, and so forth). In different contexts, users can perform different tasks.

BRIEF DESCRIPTION OF THE DRAWINGS

Some embodiments are described with respect to the following figures.

DETAILED DESCRIPTION

Figure 1:
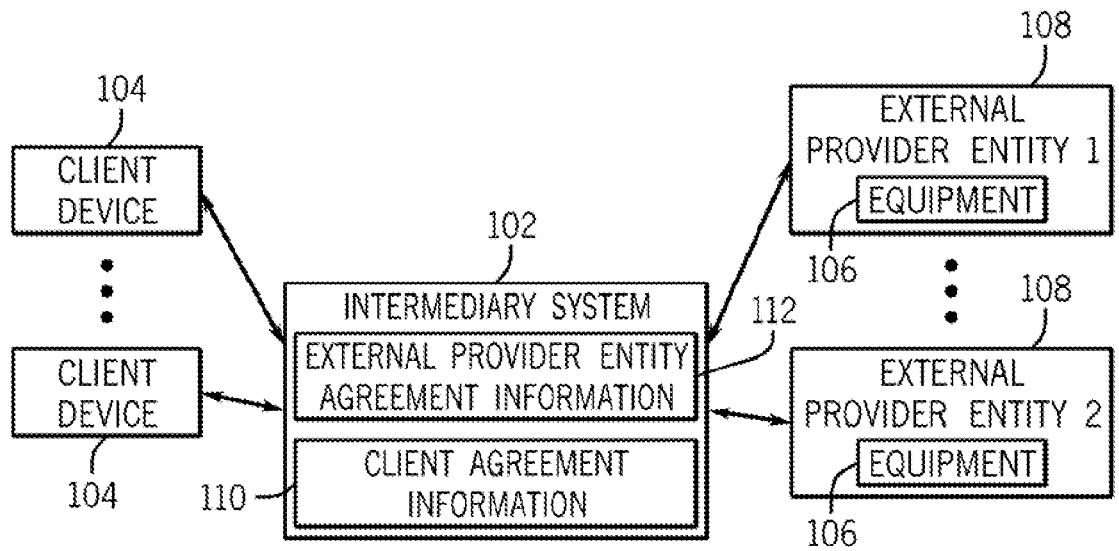
FIG. 1 is a block diagram of an example arrangement that includes an intermediary system according to some implementations.

Using one or multiple electronic devices, a user can perform various different tasks. Examples of electronic devices include a desktop computer, a notebook computer, a tablet computer, a personal digital assistant (PDA), a smartphone, a game appliance, and so forth. A user can be associated with a personal grid, which can include multiple electronic devices that can be used by the user. Content can be shared across the multiple electronic devices of the personal grid.

In some examples, a user can roam between different geographic locations. As the user moves to different geographic locations, it may be desirable to leverage equipment that may be available at the different locations to perform tasks requested by the user. Examples of equipment can include any of the following: a display device, an audio player, a computer, and so forth. A further example of equipment can include a network communication infrastructure to allow access of a network connection, such as a wired connection or wireless connection (e.g. WiFi hotspot, Bluetooth wireless connection, cellular access network, etc.). As a user moves between different locations, different equipment may become available to perform tasks requested by the user.

The devices or network communication infrastructure available at different locations may be owned by different external provider entities. An external provider entity refers to any person (individual or organization) that owns, manages, or operates respective equipment, such as display devices, audio players, computers, network communication devices, and so forth. The external provider entity is distinct from the user.

Equipment owned or managed by an external provider entity is referred to as "external provider equipment" in the ensuing discussion.

The different devices and network communication infrastructure of an external provider equipment can be associated with different protocols and different access mechanisms (e.g. authentication and authorization mechanisms). The different protocols can refer to different protocols used to interact or communicate with the external provider equipment. The authentication and authorization mechanisms are used to determine whether a user is a trusted user and is authorized to access the requested functions at the external provider equipment.

It may be relatively difficult or complex for a client device (belonging to a user) to discover external provider equipment, at various different locations, that the user may use to perform a given task. Moreover, it can be difficult or complex for the client device to understand access mechanisms and/or protocols for accessing functions of the external provider equipment. Since a user may potentially roam to any of many different geographic locations, there can potentially be a relatively very large number of external provider equipment that would have to be discovered by a client device to allow the client device to access such external provider equipment for performing client tasks. Note also that the geographic locations to which a user may roam may not be known a priori. In some cases, a user may travel to an unplanned location or new location that the user has not previously visited.

Different external provider equipment can also be associated with different user interfaces, some of which may be unfamiliar to a user. When presented with an unfamiliar user interface to access functions of external provider equipment, the user may make incorrect inputs, or may simply, give up if the user is unable to understand the user interface.

Additionally, there can be a relatively large number of users who may desire to leverage the external provider equipment to perform respective tasks of the corresponding users. It may therefore be burdensome for each external provider entity to have to maintain authentication information and other information regarding each of a potentially large pool of users. The authentication information is used to maintain a trust relationship such that the external provider entity can be sure that whoever is accessing its external provider equipment is who the person purports to be and that this person is authorized to access the external provider equipment.

In accordance with some implementations, an intermediary system is provided that bridges a trust gap between external provider entities and users, such that access rights to selected external provider equipment can be provided in a timely fashion, and with reduced burden on users and external provider entities. An access right provides a right to use respective external provider equipment.

Generally, the intermediary system acts as a broker to provide a trust relationship and to provide a grant of a right to use of external provider equipment. An "intermediary system" can refer to a computer system, or multiple computer systems, and any associated intermediary infrastructure (e.g. storage subsystem, communication subsystem, etc.) that performs the broker functionalities. Additionally, an "intermediary system" can refer to a service provider that operates the computer system(s) and any associated intermediary infrastructure. More generally, an "intermediary system" can refer to either the computer system(s) and any associated intermediary infrastructure, or to the service provider of such computer system(s) and any associated intermediary infrastructure, or to both.

In accordance with some implementations, the intermediary system can establish an agreement with each of multiple external provider entities whose equipment may be useable by a client device. As a result of these agreements between the intermediary system and the external provider entities, the intermediary system is considered to be registered with each of the external provider entities. The intermediary system can store information such as authentication credentials (to allow authentication of the intermediary system at the respective external provider entity), and other information (discussed further below).

The intermediary system can also establish an agreement with each of multiple users to allow the users to be registered with the intermediary system, such that the users can be granted a right to use external provider equipment that is the subject of the agreements between the intermediary system and the multiple external provider entities. Once a given user is registered with the intermediary system, the intermediary system is able to track one or multiple client devices of the user, such that upon receipt of a request from a client device, the intermediary system can select appropriate external provider equipment to perform a task specified by the client request. As a result of the user registration, the intermediary system can store client information such as any or some combination of the following: a client credential (to authenticate the user), service grant information (to identify one or multiple services granted to the user), and personal grid information (identifying the electronic devices that are part of the user's personal grid).

Note that a user can be associated with a number of electronic devices (also referred to as "client devices"). The user can use any of the electronic devices to perform communications or other tasks. These electronic devices that are associated with the user can be considered to be part of the personal grid of the user. Examples of electronic devices include any or some combination of the following: a desktop computer, a notebook computer, a tablet computer, a personal digital assistant (PDA), a smartphone, a game appliance, and so forth.

Based on information associated with the pre-established agreements between the intermediary system and respective external provider entities, a client device associated with a user that has registered with the intermediary system can use selected external provider equipment, including devices or network communication infrastructure (that provides network connections), to perform a task specified by a client request. The pre-established agreements between the intermediary system and respective external provider entities and the pre-established agreements between the intermediary system and respective users can be utilized by the intermediary system to smoothly and quickly obtain trust (authentication and authorization) and a grant of a right of use for any selected external provider equipment. The external provider equipment can be accessed by a client device either directly or indirectly via the intermediary system.

In addition to authentication information to allow the intermediary system to be authenticated by each of the external provider entities, the intermediary system can also obtain additional information that allow the intermediary system to quickly discover external provider equipment, obtain access of external provider equipment, understand the access mechanisms and operating protocols associated with the external provider equipment, and so forth. In some examples, the additional information can include operational information or instructions on how to use the external provider equipment, location information to decide which external provider equipment is best to use to perform a client task, and so forth. This additional information can be obtained as part of an agreement established between the intermediary system and the respective external provider entity.

FIG. 1 depicts an example arrangement that includes an intermediary system 102 that is coupled to client devices 104 and external provider equipment 106 of respective external provider entities 108. The intermediary system 102 can include a computer system and any associated intermediary infrastructure (e.g. storage subsystem, communication subsystem, etc.) at a particular location, or alternatively, the intermediary system 102 can include a distributed arrangement of computer systems and associated intermediary infrastructure at multiple different locations distributed across any geographic region, such as a city, state, country, or the entire world.

The intermediary system 102 is able to establish client agreements with each of respective users of the corresponding client devices 104. Information pertaining to the client agreements can be stored as client agreement information 110 by the intermediary system 102.

In addition, the intermediary system 102 can establish agreements with each of the external provider entities 108. Information pertaining to such agreements between the intermediary system 102 and the external provider entities 108 can be stored as external entity agreement information 112 by the intermediary system 102.

The client agreement information 110 and external entity agreement information 112 can be stored in one or multiple databases maintained by the intermediary system 102, where the databases can be stored in one or multiple storage subsystems accessible by the intermediary system 102.

Figure 2:
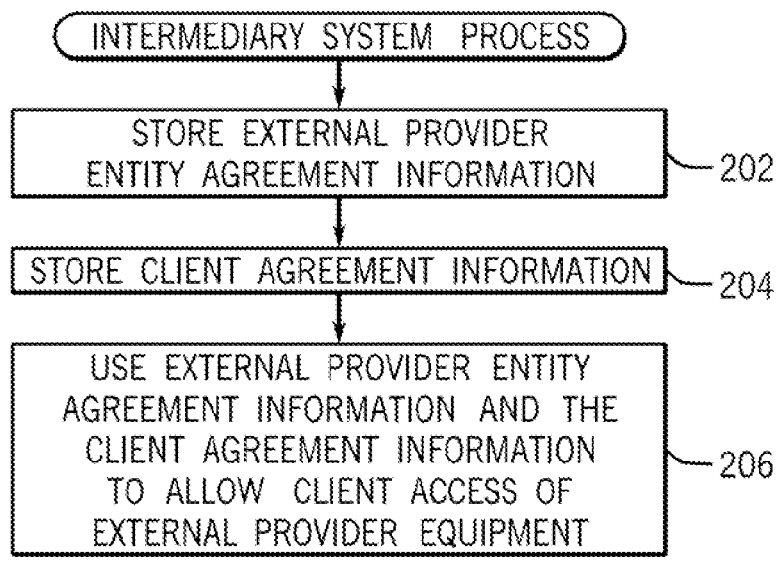
FIG. 2 is a flow diagram of a process according to some implementations.

FIG. 2 is a flow diagram of a process performed by the intermediary system 102, according to some implementations. The intermediary system 102 stores (at 202) the external entity agreement information 112, which is based on agreements between the intermediary system 102 and respective external provider entities 108 that operate respective external provider equipment 106. The stored external entity agreement information 112 contains information to allow the intermediary system 102 to authenticate itself with respect to each respective external provider entity 108, and also includes information to enable access of the respective external provider entity 108.

The intermediary system 102 also stores (at 204) the client agreement information 110. The client agreement information can be provided as part of a registration process in which a user establishes an agreement with the intermediary system 102.

The intermediary system can use (at 206) the external provider entity agreement information 112 and the client agreement information 110 to allow client device access of external provider equipment, based on a request from a client device of the user that has an established agreement with the intermediary system 102.

Based on the client request (and a context associated with the client request), the intermediary system 102 can automatically select from among different external provider equipment associated with respective provider entities to allow a task requested by the user to complete. The intermediary system 102 is in a position to establish a context associated with a user and thus assist in the discovery of potential external devices for the personal grid. Because the intermediary system 102 is tracking locations of client devices of a given user, and understands previous historical patterns as well as (potentially) future events, the intermediary system 102 can establish a corresponding context so that the intermediary system 102 can make the best selection of external provider equipment on behalf of a client request.

The selected external provider equipment can include one or multiple devices to perform various functions, including a display function (to display content), an audio play function (to play audio), a processing function (to perform processing, such as by a computer), and so forth. The selected external provider equipment can also include a network communication infrastructure to allow the client device to make a network connection to communicate over a network.

Note that the selected external provider equipment can be considered to be temporarily added to the personal grid of a client, to perform task(s) on behalf of the client. The task(s) performed by the selected external provider equipment can be in place of or in addition to task(s) performed by client device(s) in the personal grid.

In some examples, the intermediary system 102 is able to use habitual information of a user to select from among external provider equipment for performing a target task requested by the user, "Habitual information" refers to information determined based on previous interactions of the user, which can involve performance of the target task or a similar task. Such previous interactions indicate a habit of the user, which can be used to deduce which external provider equipment may be preferred by the user to perform the target task.

Using techniques or mechanisms according to some implementations, the intermediary system 102 can allow a user (or client device(s) of the user) to roam to different locations, and to selectively employ corresponding external provider equipment to perform tasks requested by a client device. The intermediary system 102 can support access of external provider equipment 106 associated with a relatively large number of external provider entities 108. Also, the intermediary system 102 can also support a relatively large number of users, By using the intermediary system 102, the burden on users and external provider entities associated with selective use of external provider equipment can be reduced, since the intermediary system 102 is able to obtain information associated with the external provider entities and the users in advance of actual selective use of the external provider equipment by the users.

The ensuing discussion describes further details of the content of the client agreement information 110 and the external entity agreement information 112, according to various implementations.

Figure 3:
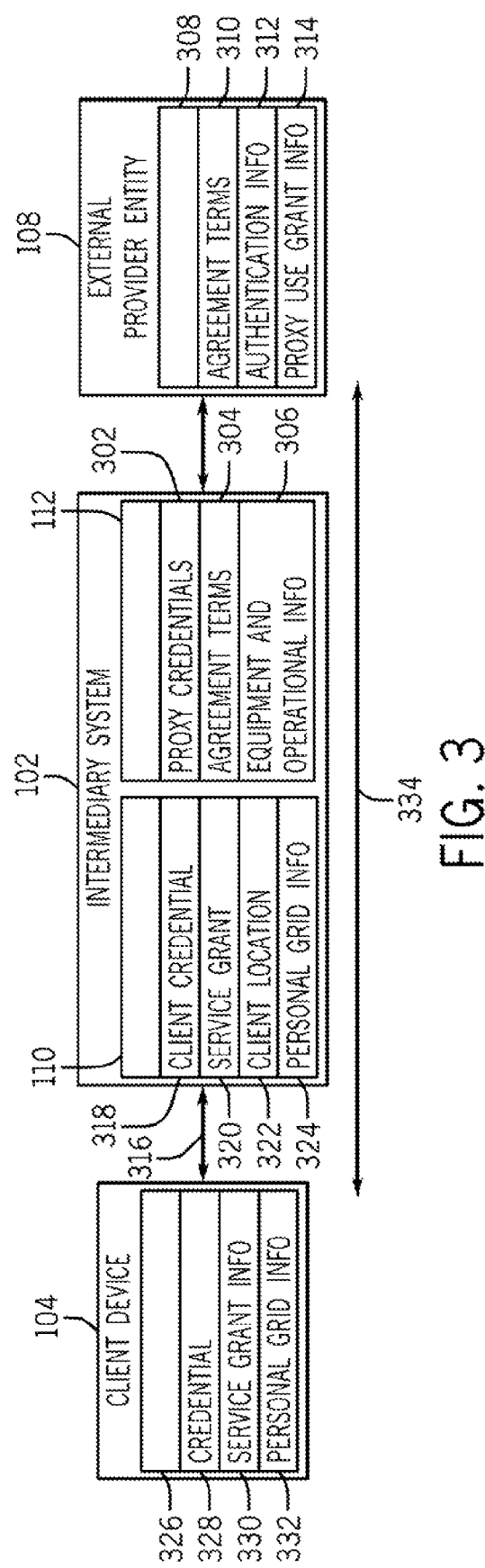
FIGS. 3-6 depict further details regarding information that can be stored in various devices, in accordance with some implementations.

Referring to FIG. 3, the external provider entity agreement information 112 derived from an agreement (300) between the intermediary system 102 and a corresponding external provider entity 108 can include any or some combination of the following information: proxy credentials 302, agreement terms 304, and equipment and operational information 306, The agreement 300 between the intermediary system 102 and the external provider entity 108 results in the intermediary system 102 being registered with the external provider entity 108, and the intermediary system 102 being granted client proxy rights with respect to use of the corresponding external provider equipment 106. The client proxy rights allow the intermediary system 102 to grant a right to use the corresponding external provider equipment 106 to a requesting client device.

As a result of the agreement 300, the external provider entity 108 also stores information 308 associated with the intermediary system 102, including any or some combination of the following, for example: agreement terms 310, authentication information 312 to verify the identity of the intermediary system 102, and proxy use grant information 314 to enable the intermediary system 102 to enable client use of the corresponding external provider equipment.

FIG. 3 also depicts an agreement (316) established between a user and the intermediary system 102, which results in the user being registered at the intermediary system 102, such that the user is granted certain access rights (including the ability to use selected external provider equipment) by the intermediary system 102. The client agreement information 110 (based on the agreement 316) stored at, the intermediary system 102 can include any one or some combination of the following, for example: client credential 318 (to allow the intermediary system 102 to authenticate a user), service grant information 320 (to identify what service has been granted to the user), client location information 322 (to identify a location of a client device as tracked by the intermediary system 102 or as reported by the client device 104), and personal grid information 324 (to identify the electronic devices in the user's personal grid). Note that the client location information 322 can also include a home location of the user, in some examples. The client location information 322 can be updated as the user (or client device(s) of the user) reams and the position of the user (or client device(s)) changes.

The client device 104 also stores certain information 326 based on the agreement 316. In some examples, the information 326 can include any or some combination of the following: credential 328 of the intermediary system 102 that is used to authenticate the intermediary system 102 when services of the intermediary system 102 are desired, service grant information 330, and personal grid information 332.

During operation, when a client device roams and requests a task that would involve use of selected external provider equipment 106, the intermediary system 102 can contact each respective external provider entity to select the desired external provider equipment 106 (using the external provider entity agreement information 112) to use on behalf of the requesting client device. Information relating to the selected external provider equipment can be shared with the client device 104, which can establish a link (334) with the selected external provider equipment to use the selected external provider equipment. Note that the link 334 can represent either a direct link (to allow the client device 104 to directly access the selected external provider equipment) or an indirect link (to allow the client device 104 to access the selected external provider equipment through the intermediary system 102).

Figure 4:
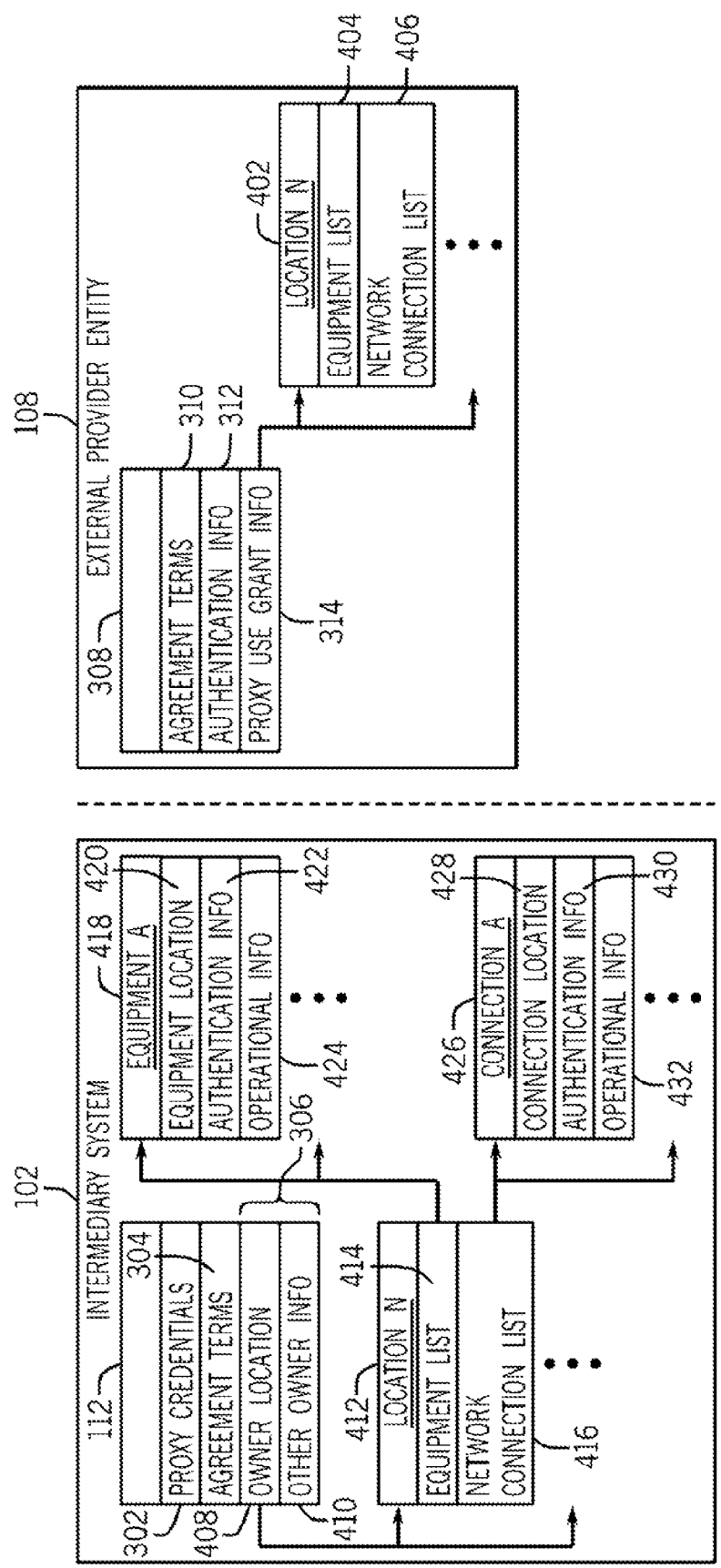

FIG. 4 shows more detail about the external provider entity agreement information 112 stored by the intermediary system 102 and the information 308 stored by an external provider entity 108 (discussed above in connection with FIG. 3). The proxy use grant information 314 enables the intermediary system 102 to use the external provider equipment 106 as a proxy for users of the intermediary system 102. In some examples, as depicted in FIG. 4, the proxy use grant information 314 can include per-location information 402 that includes an equipment list 404 and a network connection list 406. Note that "including" the equipment list 404 and the network connection list 406 in the per-location information 402 can refer to the equipment list 404 and network connection list 406 being part of the per-location information 402 or being pointed to by the per-location information 402. In the ensuing discussion, reference to information "including" other information is to be understood in like manner. Note that the external provider entity 108 can have external provider equipment at multiple locations, in some examples. Each location would be associated with a respective instance of the per-location information 402.

The equipment list 404 includes a list of devices of the external provider entity 108 available at the corresponding location. The network connection list 406 includes a list of network communication devices available at the corresponding location that supports respective network connections, which can be a wired network connection and/or a wireless network connection (e.g. WiFi connection, Bluetooth connection, cellular network connection, etc.).

As further depicted in FIG. 4, the equipment and operational information 306 that is part of the external provider entity agreement information 112 stored at the intermediary system 102 can include location-based information 408 and other information 410 associated with the corresponding external provider entity.

The location-based information 408 includes multiple instances of per-location information 412 (similar to the per-location information 402 at the external provider entity 108) for respective different locations at which the corresponding external provider entity maintains equipment. The per-location information 412 includes an equipment list 414 and a network connection list 416.

The equipment list 414 further includes multiple instances of equipment information 418 for each device of the external provider entity at the corresponding location (e.g. location N). Each instance of the equipment information 418 includes location information 420 to identify a location of the respective device of the external provider entity, authentication information 422 used to gain access to the device, and operational information 424 relating to protocols and other information used to operate the device.

The network connection list 416 includes multiple instances of network connection information 426 at the corresponding location (e.g. location N). Each instance of the network connection information includes location information 428 to identify a location of a network communication device that supports the respective network connection, authentication information 430 used to gain access to the network connection, and operational information 432 relating to protocols and other information for discovering and operating the network connection.

Figure 5:
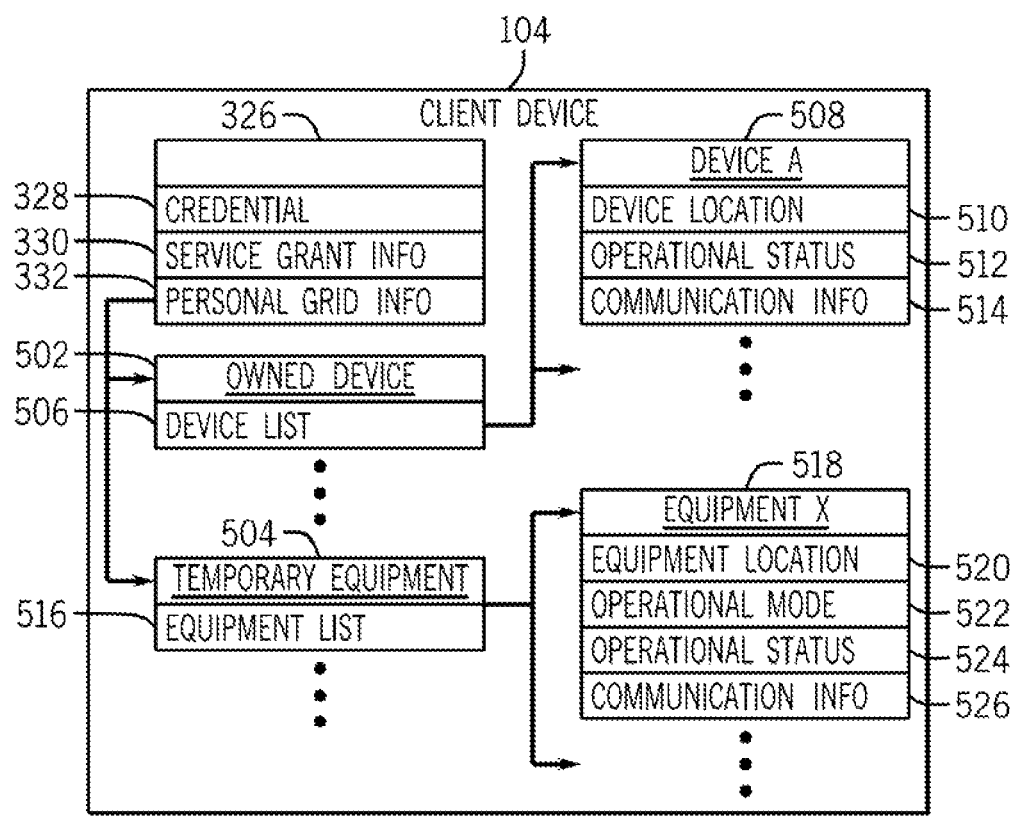

FIG. 5 shows more detail about the information 326 stored at the client device 104 as a result of the agreement 316 (FIG. 3) between the client and the intermediary system 102. Corresponding information stored at the intermediary system 102 is discussed in connection with FIG. 6. More specifically, additional details of the personal grid information 332 are depicted in FIG. 5.

The personal grid information 332 can include multiple instances of owned device information 502, where each instance of the owned device information 502 relates to a corresponding client device that is part of the personal grid of a given user (and thus owned by the user). The personal grid information 332 also includes multiple instances of temporary equipment information 504, where each instance of the temporary equipment information 504 pertains to an external provider equipment that was selected for temporary use by the client to perform a requested task. Each such temporarily selected external provider equipment can be considered to have been added (temporarily) to the personal grid of the user.

The owned device information 502 includes a device list 506, which includes multiple instances of device information 508, where each instance of the device information 508 corresponds to a respective device owned by the user. The device information 508 includes device location information 510 to identify a location of the respective client device (note that this location information 510 can be updated as the client device roams), operational status information 512 to indicate an operational status of the client device, and communication information 514 to identify communication links that the client device has established.

The temporary equipment information 504 includes an equipment list 516, which includes multiple instances of equipment information 518 that corresponds to respective external provider equipment temporarily added to the client's personal grid by the intermediary system 102. Each instance of the equipment information 518 includes location information 520 to identify a location of that external provider equipment, operational mode information 522 to indicate if the external provider equipment is being utilized directly by the client or by the intermediary system 102, operational status information 524 to indicate an operational status of the external provider equipment, and communication information 526 to identify communication links that the external provider equipment has established.

Figure 6:
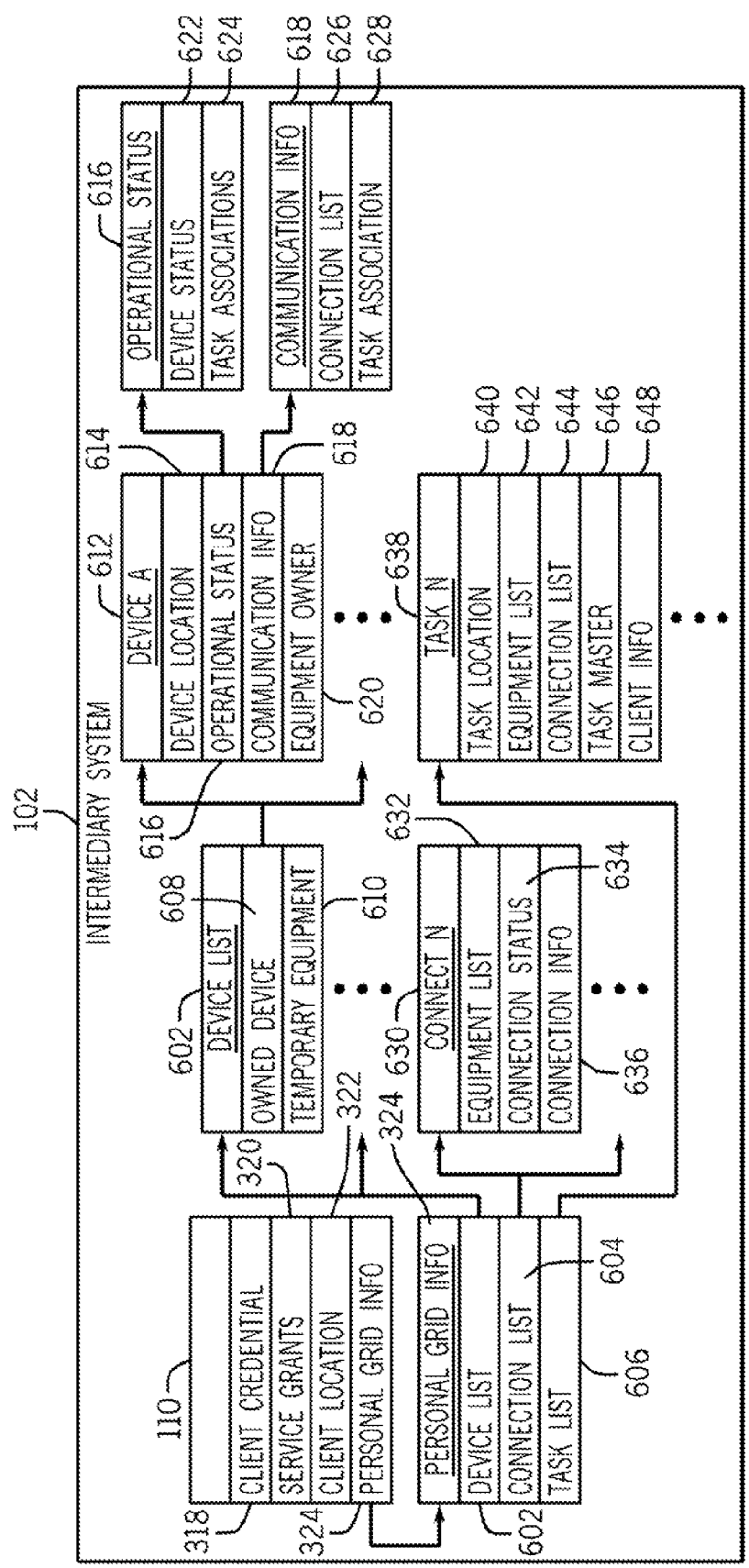

FIG. 6 depicts additional details regarding the client agreement information 110 stored at the intermediary system 102. More specifically, FIG. 6 depicts additional details regarding the personal grid information 324 that is part of the client agreement information 110.

The personal grid information 324 includes a device list 602, a connection list 604, and a task list 606. The device list 602 includes owned device information 608 and temporary equipment information 610, where the owned device information 608 identifies client devices that are owned by the respective client, while the temporary equipment information 610 identifies external provider equipment that have been temporarily included in the personal grid of the client.

The owned device information 608 includes multiple instances of device information 612, where each instance of the device information 612 corresponds to a respective client device. The device information 612 includes location information 614 to identify a location of the corresponding client device, operational status information 616 to indicate an operational status of the client device, communication information 618 to identify communication links that the client device has established, and device owner information 620 to identify the owner of the client device.

The temporary equipment information 610 contains similar information as the device information 612. Additionally, the temporary equipment information 610 can further contain an operational mode information that indicates whether the corresponding external provider equipment is interfacing directly with the client device or with the intermediary system 102.

As further shown in FIG. 6, the operational status information 616 includes a device status (indicating a status of the client device) and task association information 624 (to indicate tasks that are performed by the client device for a corresponding request or requests).

The communication information 618 includes a connection list 626 that identifies the network connections that are being used by the client device, and a task association information 628 that identifies asks associated with the network connections.

The connection list 604 that is included in the personal grid information 324 includes multiple instances of network connection information 630, where each instance of the network connection information 630 corresponds to a respective network connection that has been established by a client device in the personal grid. The network connection information includes an equipment list 632 that identifies network communication device(s) involved in the network connection, a connection status information 634 to indicate a status of the network connection, and connection information 636 that describes protocols and other information relating to access or operation of the network connection. Note that a given client device can potentially have multiple interfaces to different network connections, which can be used to communicate with another client device or with external provider equipment.

The task list 606 includes multiple instances of task information 638, where each instance of the task information 638 corresponds to a respective task that is performed by a client device of the personal grid. Each task information instance 638 contains task location information 640 (to identify a location of the respective task), and equipment list information 642 (to identify equipment that is involved in performing the task, where the identified equipment can include client device(s) and/or external provider equipment), a connection list 644 (to identify network connection(s) used by the task), task master information 646 (to identify an entity that is orchestrating the task, where the entity can be the client device, the intermediary system 102, or some other entity), and client information 648 (to identify information regarding the client for which the task is being performed).

Figure 7:
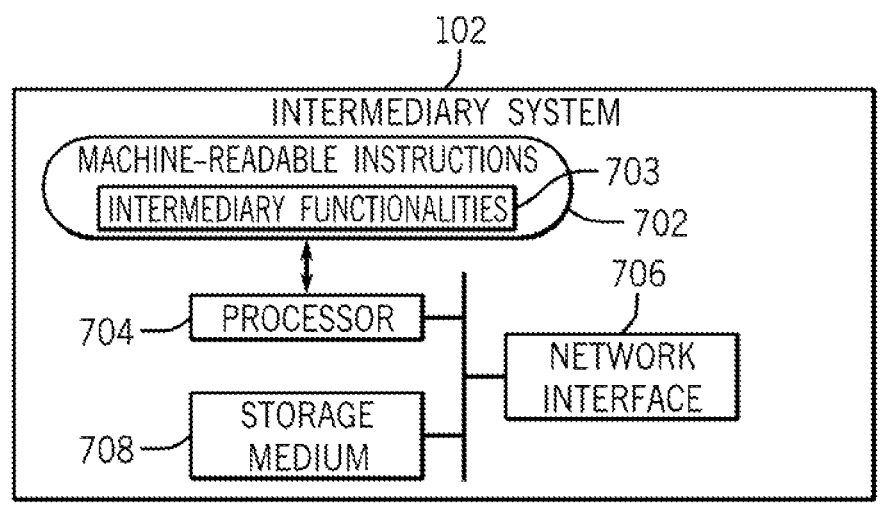
FIG. 7 is a block diagram of an example intermediary system according to some implementations.

FIG. 7 is a block diagram of an example arrangement of the intermediary system 102 in accordance with some implementations. As noted above, the intermediary system 102 can be implemented with a computer system and any associated intermediary infrastructure at a particular location, or alternatively, the intermediary system 102 can include a distributed arrangement of computer systems and associated intermediary infrastructure at multiple different locations distributed across any geographic region, such as a city, state, country, or the entire world. The intermediary system 102 can run at a central location (different from the client's location), could be part of a machine in the same location as the client, can run on one of the devices in the clients personal grid, or in multiple locations.

The intermediary system 102 includes machine-readable instructions 702, which can include any of various functionalities 703 of the intermediary system 102 as discussed above. For example, the machine-readable instructions 702 can be executable to perform the tasks of FIG. 2. The machine-readable instructions 702 are executable on one or multiple processors 704, which can be coupled to a network interface 706 and a storage medium (or storage media) 708. A processor can include a microprocessor, microcontroller, processor module or subsystem, programmable integrated circuit, programmable gate array, or another control or computing device.

The network interface 706 can include one or multiple network interface controllers to allow the intermediary system 102 to communicate with external devices, such as the client devices 104 and external provider equipment 106 of FIG. 1.

The storage medium (or storage media) 708 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article for article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
storing, by an intermediary system, agreement information based on agreements between an intermediary service provider and a plurality of provider entities that operate respective multiple equipment, wherein the agreement information includes information to enable access of each of the multiple equipment by a client device; and
storing, by the intermediary system, client information associated with the client device, where the client information is based on registration of a user of the client device with the intermediary service provider,
wherein the agreement information and client information is useable to provide access by the client device of selected ones of the respective multiple equipment.

2. The method of claim 1, wherein storing the client information comprises storing information based on an agreement between the user and the intermediary system.

3. The method of claim 2, further comprising:
storing additional information based on additional agreements between the intermediary system and respective additional users.

4. The method of claim 2, wherein storing the client information comprises storing information regarding a personal grid of the user, the personal grid including multiple client devices of the user.

5. The method of claim 2, wherein storing the client information comprises storing a location of the client device.

6. The method of claim 1, wherein storing the agreement information comprises storing a credential to allow the intermediary system to be authenticated by a respective external provider entity.

7. The method of claim 6, wherein storing the agreement information further comprises storing equipment and operational information that describes protocols associated with operating the respective multiple equipment of the plurality of provider entities.

8. The method of claim 1, wherein storing the client information comprises storing information relating to a personal grid of the user, wherein the information relating to the personal grid includes information relating to client devices owned by the user and equipment of one or multiple ones of the plurality of provider entities that have been temporarily added to the personal grid.

9. The method of claim 1, wherein storing the client information comprises storing information relating to a plurality of network connections established by the client device.

10. An intermediary system comprising:
a storage system to store agreement information based on agreements between an intermediary service provider of the intermediary system and a plurality of provider entities that operate respective multiple equipment, wherein the agreement information includes information to enable access of each of the multiple equipment by a client device, and wherein the storage system is to further stare client information associated with the client device, where the client information is based on an agreement between a user of the client device and the intermediary service provider; and
at least one processor to use the agreement information and the client information to provide access of selected ones of the respective multiple equipment by the client device in response to requests of the client device.

11. The intermediary system of claim 10, wherein the client information includes information identifying client devices owned by the user and information relating to selected ones of the respective multiple equipment that have been made available for use by the client devices of the user.

12. The intermediary system of claim 10, wherein the client information includes location information identifying a location of each of client devices owned by the user, and an operational status of each of the client devices owned by the user.

13. The intermediary system of claim 10, wherein the client information includes information pertaining to each of multiple network connections established by at least one client device of the user.

14. The intermediary system of claim 13, wherein the client information further includes task information that identifies tasks being performed for a request of the at least one client device.

15. An article comprising at least one non-transitory computer-readable storage medium that stores instructions that upon execution cause an intermediary system to:
access agreement information based on agreements between an intermediary service provider and a plurality of provider entities that operate respective multiple equipment, wherein the agreement information includes information to enable access of each of the respective multiple equipment by a client device;
access client information associated with the client device, where the client information is based on registration of a user of the client device with the intermediary service provider; and
use the agreement information to provide access by the client device of selected ones of the respective multiple equipment.

* * * * *